May 28, 1929.  G. A. MONTGOMERY  1,714,613
BED FOR VEHICLES
Filed Sept. 8, 1926   2 Sheets-Sheet 1
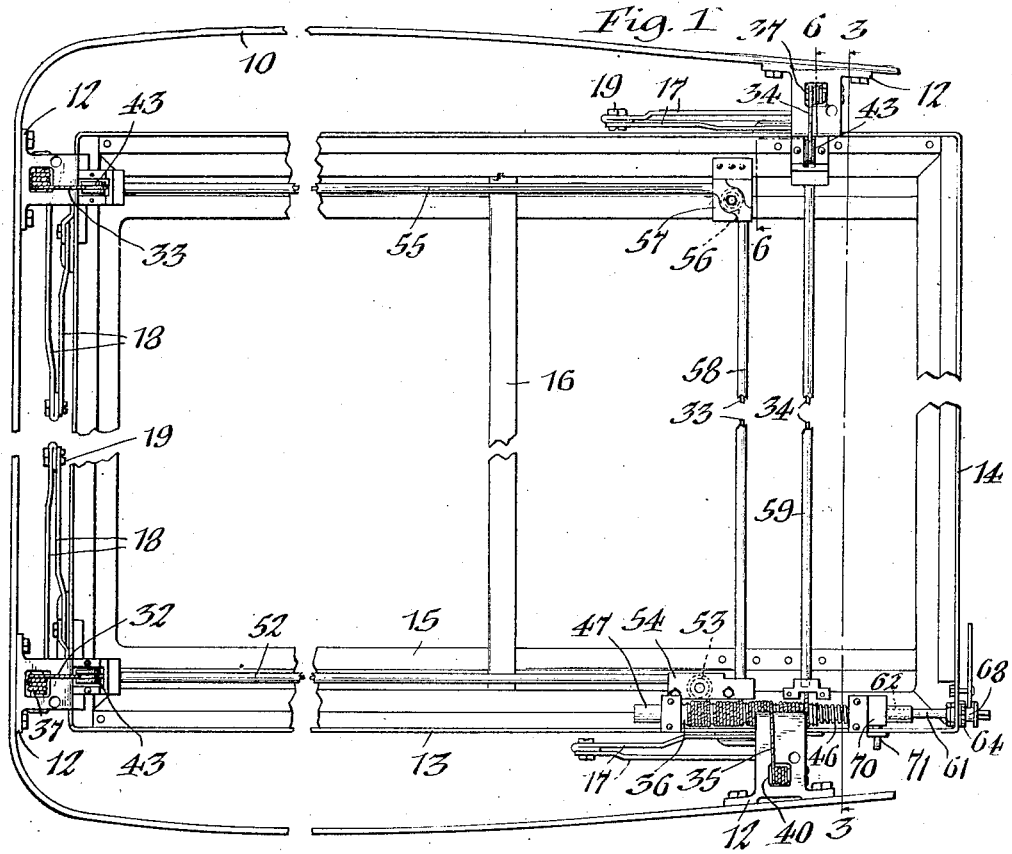
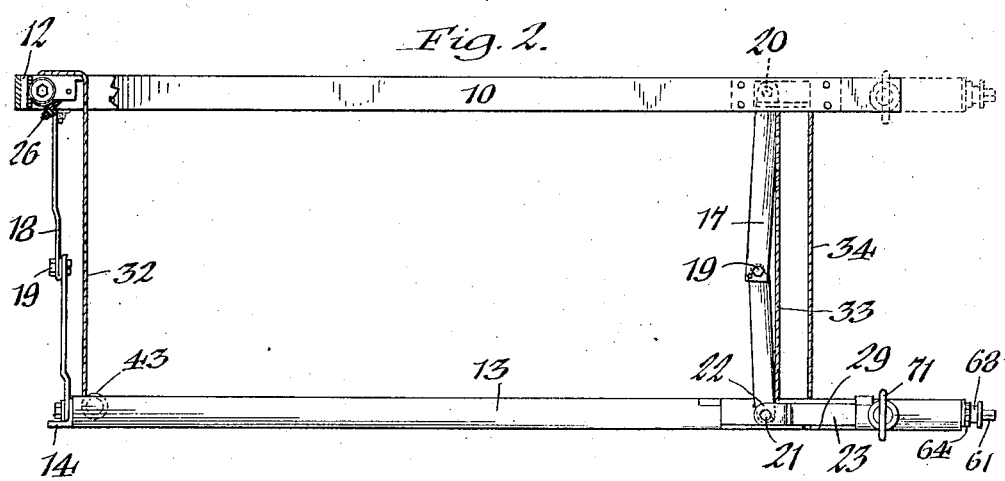
Inventor,
Gustavus A. Montgomery,
by Geyer & Geyer
Attorneys.

May 28, 1929.  G. A. MONTGOMERY  1,714,613
BED FOR VEHICLES
Filed Sept. 8, 1926   2 Sheets-Sheet 2
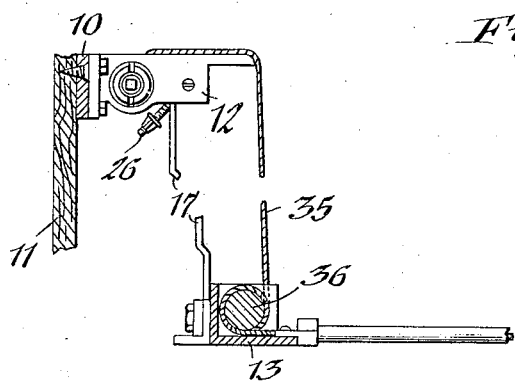
Fig. 3.
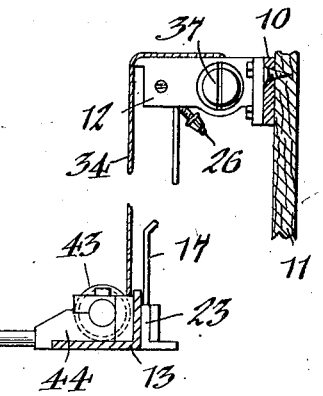
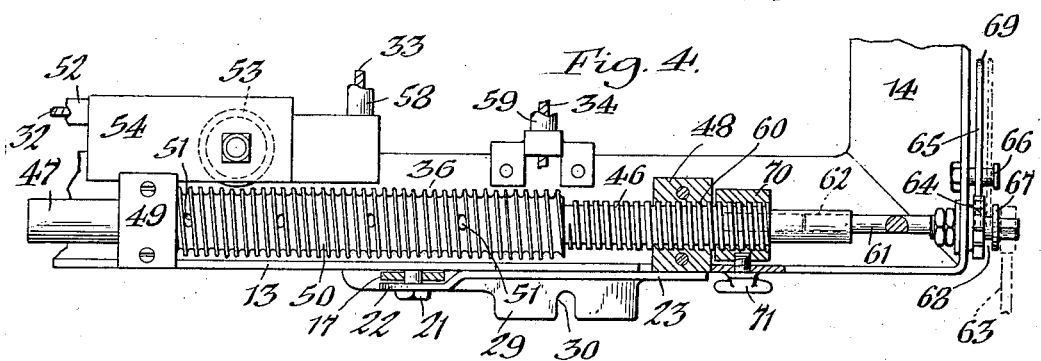
Fig. 4.
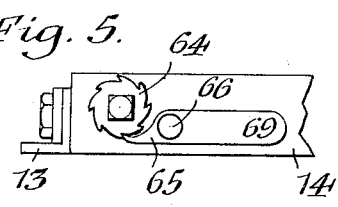
Fig. 5.
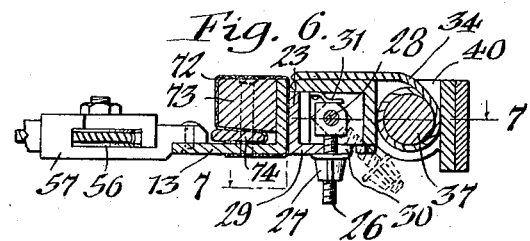
Fig. 6.
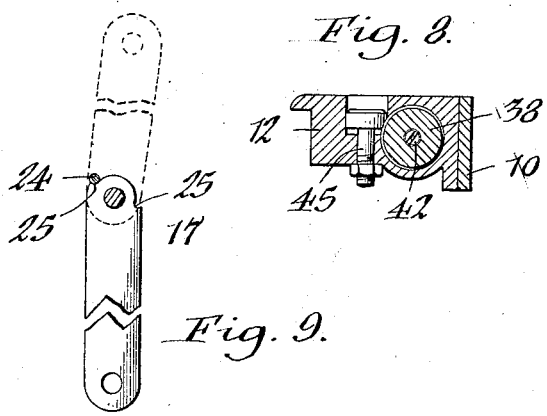
Fig. 8.   Fig. 9.
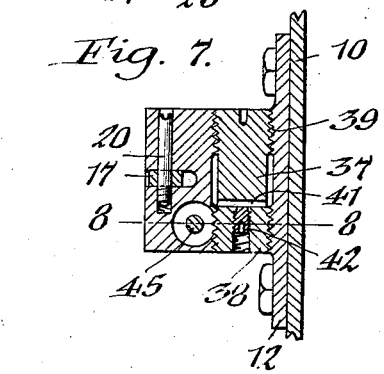
Fig. 7.
Inventor,
Gustavus A. Montgomery,
by Geyer & Geyer
Attorneys.

Patented May 28, 1929.

1,714,613

UNITED STATES PATENT OFFICE.

GUSTAVUS A. MONTGOMERY, OF TITUSVILLE, PENNSYLVANIA.

BED FOR VEHICLES.

Application filed September 8, 1926. Serial No. 134,183.

This invention relates to improvements in automobile beds.

One of its objects is the provision of a practical and comfortable bed installation for closed cars which is normally disposed against the roof or ceiling of the car and which can be quickly lowered for use when desired.

Another object of the invention is to provide an automobile bed which is so constructed that it can be readily installed in newly manufactured cars or in those now in use without altering or changing the design of the car-body, which is compact and neat in appearance and will not detract from the interior finish or lines of the car.

A still further object of the invention is the provision of novel mechanism for effecting the raising and lowering movements of the bed-frame.

In the accompanying drawings:—

Figure 1 is a top plan view of an automobile bed embodying my invention. Figure 2 is a side elevation thereof. Figure 3 is an enlarged fragmentary transverse section on line 3—3, Fig. 1. Figure 4 is an enlarged fragmentary top plan view, partly in section, of the elevating mechanism. Figure 5 is a fragmentary front end view thereof. Figure 6 is an enlarged transverse section on line 6—6, Fig. 1. Figure 7 is a horizontal section on line 7—7, Fig. 6. Figure 8 is a transverse section on line 8—8, Fig. 7. Figure 9 is a fragmentary view of one of the sets of foldable suspension arms.

Similar characters of reference indicate corresponding parts throughout the several views.

In its general organization, the bed comprises a suitable platform suspended from the interior walls of the car adjacent the ceiling by foldable or collapsible arms, and mechanism for effecting the raising and lowering movements of the bed.

The various elements of this improved bed are preferably supported and suspended from a sustaining bar or member 10 suitably fastened to the upright posts 11 of the car-frame and extending around the sides and rear end thereof in the manner shown in Fig. 1. Attached to this sustaining bar adjacent the four corners of the car-body are brackets 12 to which the upper ends of the suspension arms and the cables of the elevating mechanism are connected.

The bed-frame may be of any appropriate construction, that shown in the drawings being rectangular in shape and preferably composed of longitudinal side bars 13 and transverse end bars 14 of angle iron, and reinforcing slats 15 and 16 running lengthwise and crosswise thereof. This frame may be suitably covered on its top side with a wall-board or other appropriate material and its combined thickness together with that of the mattress and bedding is approximately two inches, so that the bed when elevated does not materially decrease the interior height of the car-body. In its elevated position, the bed rests snugly against the ceiling of the car and its bottom and sides may be covered with upholstery to match the inside trim of the car.

The bed is suspended from the brackets 12 by front and rear sets of foldable arms 17 and 18, the adjoining inner ends of each set of arms being pivoted to each other, as indicated at 19 in Fig. 2. The front set of arms are located at opposite sides of the bed-frame and are foldable lengthwise of the car-body, while the rear set are located at the rear end of said frame and are foldable transversely of the car-body. The upper arm of each set is pivoted at 20 to the corresponding corner bracket 12 and its companion lower arm is pivoted at 21 to a laterally offset ear 22 formed on a bar 23 suitably fastened to the adjoining vertical flange of the bed-frame, as shown in Figs. 3 and 4, there being one of these bars located adjacent each corner of said frame. For the purpose of limiting the unfolding of the suspension arms to slightly less than a straight line and thus always insure their folding in the proper direction when the bed is raised to its inoperative position, the inner end of one of the arms of each set is provided with a pin 24 adapted to abut against one or the other of a pair of radial stops 25 formed on the inner end of the companion arm, as shown in Fig. 9.

Suitable fasteners are employed for firmly and rigidly holding the bed in its elevated position against the ceiling of the car-body. In the preferred embodiment shown in the drawings they consist of vertically-swinging bolts 26 having wing nuts 27, one of such bolts being fulcrumed at 28 to each of the brackets 12. Projecting outwardly from each of the bars 23 secured adjacent to the corners of the bed-frame is a horizontal flange 29, which, in the elevated position of the bed, abuts against the underside of its corresponding bracket, as shown in Fig. 6. In its edge, this flange has a notch 30 with which the respective bolt 26 is adapted to register. During the operation of raising or lowering the bed, these fasteners are swung to one side, as shown by dotted lines in Fig. 6, flat springs 31 engaging a flattened corner of the bolt-heads serving to maintain them in such position.

The mechanism for effecting the raising and lowering movements of the bed is preferably constructed as follows:—

Four elevating cables 32, 33, 34 and 35 are provided which are attached at their upper ends to the respective corner brackets 12 and thence pass around guides on the bed frame to a windlassing device 36 carried by the latter near its front end. Each of said brackets contains a horizontally-disposed spool 37 having threaded ends 38 engaging correspondingly threaded openings 39 in the bracket. The body or cable-receiving portion of the spool registers with a vertical opening 40 in the bracket, the cable being suitably fastened at its end in a slot 41 in said spool by a set screw 42 and after being wound upon the latter passes upwardly through the bracket-opening,—over the top wall of the bracket as shown in Figs. 1 and 3, and thence downwardly around a pulley or guide-roller 43 journaled in a bracket 44 secured to the corresponding end of the bed-frame. By turning the spools in one direction or the other to wind up or pay out the cable, the desired elevation of the bed when lowered can be easily obtained. After adjustment, the spools are locked against rotation by transversely-arranged clamping bolts 45 mounted in the bracket 12 and having their heads chamfered on one side and bearing against the contiguous surface of the spools as shown in Fig. 8.

Mounted on the bed-frame near its front end is the windlassing device designated generally by the numeral 36 and consisting of a longitudinally-disposed drum having reduced bearing stems or spindles 46, 47 at its opposite ends journaled in bearings 48, 49, respectively. In its periphery, this drum is provided with a continuous spiral groove 50 for receiving the lower ends of the several elevating cables 32, 33, 34 and 35, which are adapted to be wound upon the drum in coils disposed side by side in the manner shown in Fig. 1, each cable occupying a certain portion of the length of the grooved drum. Openings 51 arranged in spaced relation along the drum serve to receive the free ends of the individual cables which may be fastened therein by wedges or otherwise. It will be noted that the cable 32, leading from the right hand rear bracket 12, after passing around its guide pulley 43 on the bed-frame passes forwardly through a longitudinal guide-tube 52, then around a horizontally-disposed pulley 53 supported in a bracket 54 located at the front end of the bed-frame, and thence transversely around the rear grooved portion of the winding drum 36. The cable 33 leading from the left hand rear bracket, after passing around its guide pulley 43 passes forwardly through a guide tube 55, around a horizontally-disposed pulley 56 supported in a bracket 57 located in the front end of the bed-frame, and thence transversely through a guide tube 58 to the winding drum where it is wound thereon alongside the first-described cable 32. The third cable 34 leads from the front left hand bracket 12 around its pulley 43 and thence through a transverse guide tube 59 to the front end of the winding drum. The fourth cable 35 leads directly from the front right hand bracket downwardly to the winding drum and is wound thereon between the coils of the cables 33 and 34.

This windlassing drum is capable of a combined rotary and longitudinal movement, so that as the bed is raised and lowered by the rotation of said drum, the cables will line up with the point of coiling on drum and all four corners of the bed will rise and fall simultaneously and equally. To this end, the drum-spindle 46 is externally threaded and of the same pitch as the cable-receiving groove 50 and its bearing 48 has an internally-threaded bore 60, so that when the drum is turned in one direction or the other it travels lengthwise of the bed-frame in a corresponding direction. The drum-spindle 47 at the opposite end if free to slide in its bearing 49. The drum is actuated to raise the bed by a manually-operated shaft or spindle 61 supported at its outer end in the bed-frame against axial or longitudinal movement and slidably fitted in a bore 62 of the drum spindle 46, as shown in Fig. 4, the actuating shaft and its receiving bore having complementary flat faces to compel the drum to rotate with the shaft. A suitable crank 63 or ratchet-type wrench may be employed for actuating the drum to raise and lower the bed.

At its outer end, the shaft 61 carries a ratchet wheel 64 and cooperating therewith is a vertically-swinging pawl 65 fulcrumed on a stud 66 projecting forwardly from the bed-frame. The hub 67 of the ratchet wheel contains an annular groove 68 and the pawl is free to slide lengthwise on its stud to permit the same to mesh with the ratchet wheel or be disengaged therefrom and register with said groove, as shown by full and dotted lines, respectively in Fig. 4. The pawl is held in engagement with the ratchet wheel or groove by its weighted arm 69. When lowering the bed for use, the pawl is engaged with the ratchet wheel groove and when elevating the bed, the pawl is engaged with the teeth of the ratchet wheel to hold the bed against slipping downwardly.

The bed is lowered into place by the action of its own weight but in order to retard or check its lowering movement at the will of the operator, a suitable braking mechanism is applied to the winding drum. The brake shown in Fig. 4 consists of a nut or collar 70 applied to the threaded drum-spindle 46 and connected with the adjacent upright wall of the bed-frame side bar 13 by a thumb screw 71. Thus, when the latter is turned in a direction to bring the collar toward the upright wall of the bed-frame, the drum-spindle is moved with it, with the result that its threads are drawn more or less firmly against those of its bearing 48, whereby the fall of the bed may be readily controlled and retarded.

In Fig. 6, I show one of the ways in which the upholstery 72 may be fastened to the bed-frame. Extending around the latter and fastened to the vertical wall thereof, are wooden strips or lists 73 which are spaced from the horizontal wall of the frame. The marginal portions of the upholstery extend around these lists and are tightly fastened in the space between them and the bed-frame by wedges 74. By this construction, the covering material can be stretched taut over the underside of the bed-frame and at the same time be securely held in place without the use of tacks or similar fasteners.

I claim as my invention:—

1. An automobile bed, comprising a bed-frame, a windlass carried thereby adjacent one of the corners thereof, flexible suspension members adapted for attachment at their upper ends to the several corners of an automobile roof and at their lower ends to said windlass, one of said members being in line with said windlass and directly connected therewith, and means arranged adjacent to the remaining corners of the bed-frame for guiding the other suspension members to said windlass.

2. An automobile bed, comprising a bed-frame, a windlass carried by said frame, flexible suspension members adapted for attachment at their upper ends to the roof-corners of an automobile and at their lower ends to said windlass, the latter including a spirally-grooved drum upon which the suspension members are wound and bearing stems at its opposite ends, one of said stems being externally threaded and of substantially the same pitch as the drum-grooves, and bearing members on the bed-frame for supporting said stems, the bearing member for the threaded stem having an internally-threaded bore.

3. An automobile bed, comprising brackets adapted for attachment adjacent the four corners of an automobile roof, foldable suspension means depending from said brackets, a bed-frame attached to the lower ends of said suspension means, elevating cables including a windlass carried by the bed-frame for raising and lowering the latter, and means carried by said brackets for holding said bed-frame in its elevated position.

4. An automobile bed, comprising brackets adapted for attachment adjacent the four corners of an automobile roof, a bed-frame suspended from said brackets, means for raising and lowering the bed-frame, the latter having flanges arranged to engage said brackets in the elevated position of said bed-frame, and fasteners mounted on said brackets and adapted to clamp the bed-frame flanges thereto.

5. An automobile bed, comprising a bed-frame, a combined rotary and longitudinally movable windlass mounted on said bed-frame, flexible suspension members adapted for attachment at their upper ends to the roof-corners of an automobile and at their lower ends to said windlass, one of said members being in line with said windlass and directly connected therewith, means arranged adjacent to the remaining corners of the bed-frame for guiding the other suspension members to the windlass, an actuating spindle for the windlass, the latter being rotatable with but free to move lengthwise relative to said spindle, a ratchet on said spindle, and a pawl for said ratchet.

6. An automobile bed, comprising a bed-frame, a windlass mounted thereon, elevating cables adapted for attachment at their upper ends to an automobile roof and at their free ends to said windlass, the latter including a grooved drum upon which said cables are wound and unwound, bearing stems at the opposite ends of said drum, bearing members on the bed-frame and in which said stems are journaled, one of said stems being externally threaded and its corresponding bearing member being internally threaded, means for actuating said windlass to raise and lower the bed-frame, a nut applied to said threaded-stem and disposed adjacent to its bearing member, and means for laterally moving said nut to bring said last-named stem into more or less frictional contact with its threaded bearing for checking the lowering movement of the bed-frame.

7. An automobile bed, comprising a supporting bar adapted to extend around the sides and back of an automobile body near its ceiling, brackets carried by said bar adjacent the four corners of the body, foldable suspension arms depending from said brackets, a bed-frame connected to the lower ends of said suspension arms and movable to an inoperative position against said ceiling, a windlass mounted on the bed-frame, and elevating cables attached at their upper ends to said brackets and at their lower ends to said windlass.

GUSTAVUS A. MONTGOMERY.